United States Patent
Ottesen et al.

(10) Patent No.: US 6,275,345 B1
(45) Date of Patent: Aug. 14, 2001

(54) SYSTEM AND METHOD FOR ESTIMATING A FREQUENCY OF SLIDER AIRBEARING RESONANCE

(75) Inventors: Hal Hjalmar Ottesen; Gordon James Smith, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,396

(22) Filed: Dec. 2, 1998

(51) Int. Cl.$^7$ ............................................. G11B 5/02
(52) U.S. Cl. ............................ 360/25; 360/31; 360/75; 360/53
(58) Field of Search ................... 360/31, 234, 25, 360/75, 53; 324/212, 226; 73/579, 862, 59

(56) References Cited

U.S. PATENT DOCUMENTS

| | | | |
|---|---|---|---|
| 4,777,544 | * 10/1988 | Brown et al. | 360/75 |
| 4,942,609 | 7/1990 | Meyer . | |
| 5,410,439 | * 4/1995 | Egbert et al. | 360/75 |
| 5,594,595 | * 1/1997 | Zhu | 360/31 |
| 5,604,771 | * 2/1997 | Quiros | 375/326 |
| 5,838,514 | * 11/1998 | Smith et al. | 360/75 |

* cited by examiner

Primary Examiner—Alan T. Faber

(74) Attorney, Agent, or Firm—Mark A. Hollingsworth

(57) ABSTRACT

A method and apparatus for estimating the value of a slider airbearing resonance frequency involves obtaining a readback signal from a data storage medium over a plurality of complete airbearing periods and estimating the value of an airbearing resonance frequency using the readback signal. In one embodiment, a discrete signal segment comprising a plurality of frequency transform components is produced using the readback signal information, and the value of the airbearing resonance frequency is estimated using spectral leakage in the discrete signal segment. A ratio of the magnitudes of a first DFT component to a second DFT component is computed at each of a plurality of sampling rates. Each of these sampling rates is defined by a number of samples per average airbearing cycle multiplied by a frequency falling within a range of expected airbearing frequencies associated with a given implementation. The second DFT component is related to the slider airbearing resonance frequency, and the first DFT component is a DFT component adjacent to or non-adjacent to the second DFT component. The airbearing resonance frequency value is estimated using a minimum of the ratios, which may also constitute DFT component power ratios. A number of different frequency transform techniques may be employed, including Discrete Fourier Transform, Fast Fourier Transform, and Short-Time DFT techniques. One of several frequency transform approaches may be implemented depending on whether the detected airbearing signal is stationary or non-stationary. The airbearing resonance frequency methodology may be implemented in-situ a data storage system.

34 Claims, 13 Drawing Sheets

SYSTEM AND METHOD FOR ESTIMATING A FREQUENCY OF SLIDER AIRBEARING RESONANCE

FIELD OF THE INVENTION

The present invention relates generally to data storage systems and, more particularly, to a system and method for estimating a frequency of slider airbearing resonance.

BACKGROUND OF THE INVENTION

Within the data storage system manufacturing industry, much attention is presently being focused on reducing head-to-disk clearance as part of an effort to increase the storage capacity of data storage disks. It is generally desirable to reduce the head-to-disk clearance in order to increase the readback signal sensitivity of the transducer to typically weaker magnetic transitions associated with higher density disks. When decreasing the head-to-disk clearance, however, the probability of detrimental contact between the sensitive transducer and an obstruction on the disk surface significantly increases. As head-to-disk clearance continues to decrease, it becomes increasingly important to assess the general health of each read/write head, including flying characteristics, during the operating life of a data storage system.

A prevalent surface irregularity that afflicts an appreciable percentage of conventional data storage disks is generally referred to as an asperity. Asperities are isolated submicron-sized particles, typically comprising silicon carbide material, that are embedded in the disk substrate. No single mechanism has yet been identified as the source of such asperities, and it is believed that asperity defects arise from numerous sources. Such asperities are often large enough to interfere with the flight path of a typical slider/transducer assembly by physically impacting with the slider/transducer assembly at a very high velocity.

Further, asperities arising from the surface of a data storage disk are generally distributed in a highly random manner, and change in shape and size in response to changes in disk and ambient temperatures. A collision between a slider/transducer assembly and an asperity often renders the location of the asperity unusable for purposes of reading and writing information. Moreover, repeated contact between the slider/transducer assembly and asperity may cause damage of varying severity to the slider/transducer assembly.

Magneto-resistive (MR) transducers, for example, are particularly susceptible to interference from contact with asperities. It is well-known that MR transducers are very sensitive to variations in temperature, and are frequently used as temperature sensors in other applications. A collision between an MR transducer element and an asperity results in the production of heat, and a corresponding rise in transducer element temperature. Such transient temperature deviations are typically associated with an inability of the MR transducer element to read previously written data at the affected disk surface location, thereby rendering the stored information unrecoverable. An increase in the frequency of head-to-disk contact events may be indicative of a head that is flying lower than its intended average flyheight.

In the continuing effort to minimize head-to-disk clearance, manufacturers of disk drive systems recognize the importance of detecting changes in the flying characteristics of each individual read/write head during manufacturing and, importantly, during use of the disk drive system in the field. There exists a need in the data storage system manufacturing community for an apparatus and method for detecting changes in head flyheight. There exists yet a further need to provide such an apparatus and method which is suitable for incorporation into existing data storage systems, as well as into new system designs, and one that operates fully autonomously in-situ a data storage system. The present invention is directed to these and other needs.

SUMMARY OF THE INVENTION

The present invention is directed to a method and apparatus for estimating the value of a resonance frequency of an airbearing associated with a slider flying in proximity to a data storage medium. Estimating an airbearing resonance frequency according to the present invention involves obtaining a readback signal from a data storage medium over a plurality of complete airbearing periods and estimating the value of an airbearing resonance frequency using the readback signal information.

In accordance with one embodiment, a discrete signal segment comprising a plurality of frequency transform components is produced using the readback signal information, and the value of the airbearing resonance frequency is estimated using spectral leakage in the discrete signal segment. A number of different frequency transform techniques may be employed, including Discrete Fourier Transform (DFT), Fast Fourier Transform (FFT), and Short-Time DFT (STFT) techniques, for example. One of several frequency transform approaches may be implemented depending on whether the detected airbearing signal is stationary or non-stationary over time.

In accordance with another embodiment, a ratio of the magnitude of a first DFT component of the discrete signal segment to the magnitude of a second DFT component is computed at each of a plurality of sampling rates. Each of these sampling rates is defined by a number of samples per average airbearing cycle multiplied by a frequency falling within a range of expected airbearing frequencies associated with a given design or implementation. The second DFT component is related to the resonance frequency of the slider airbearing, and the first DFT component is a DFT component preferably adjacent to the second DFT component. The first DFT component may alternatively be a DFT component non-adjacent to the second DFT component. The resonance frequency value of the slider airbearing may be estimated using a minimum of the ratios. According to another embodiment, the minimum of a number of first and second DFT component power ratios may be used to estimate the value of the airbearing resonance frequency.

The discrete signal segment is preferably produced in response to detecting contact between the slider and a feature protruding from a surface of the data storage medium. The readback signal may comprise a magnetic signal component, a thermal signal component, or magnetic and thermal signal components. Other signal forms, such as optical signals, may also be processed by a method and apparatus according to the present invention. Goertzel's algorithm may be employed to compute the magnitudes of the first and second DFT components of the discrete signal segment.

A method and apparatus for estimating a resonance frequency of an airbearing according to the principles of the present invention may be implemented in a data storage system and, preferably, implemented in-situ a data storage system without resort to circuitry external to the data storage system.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
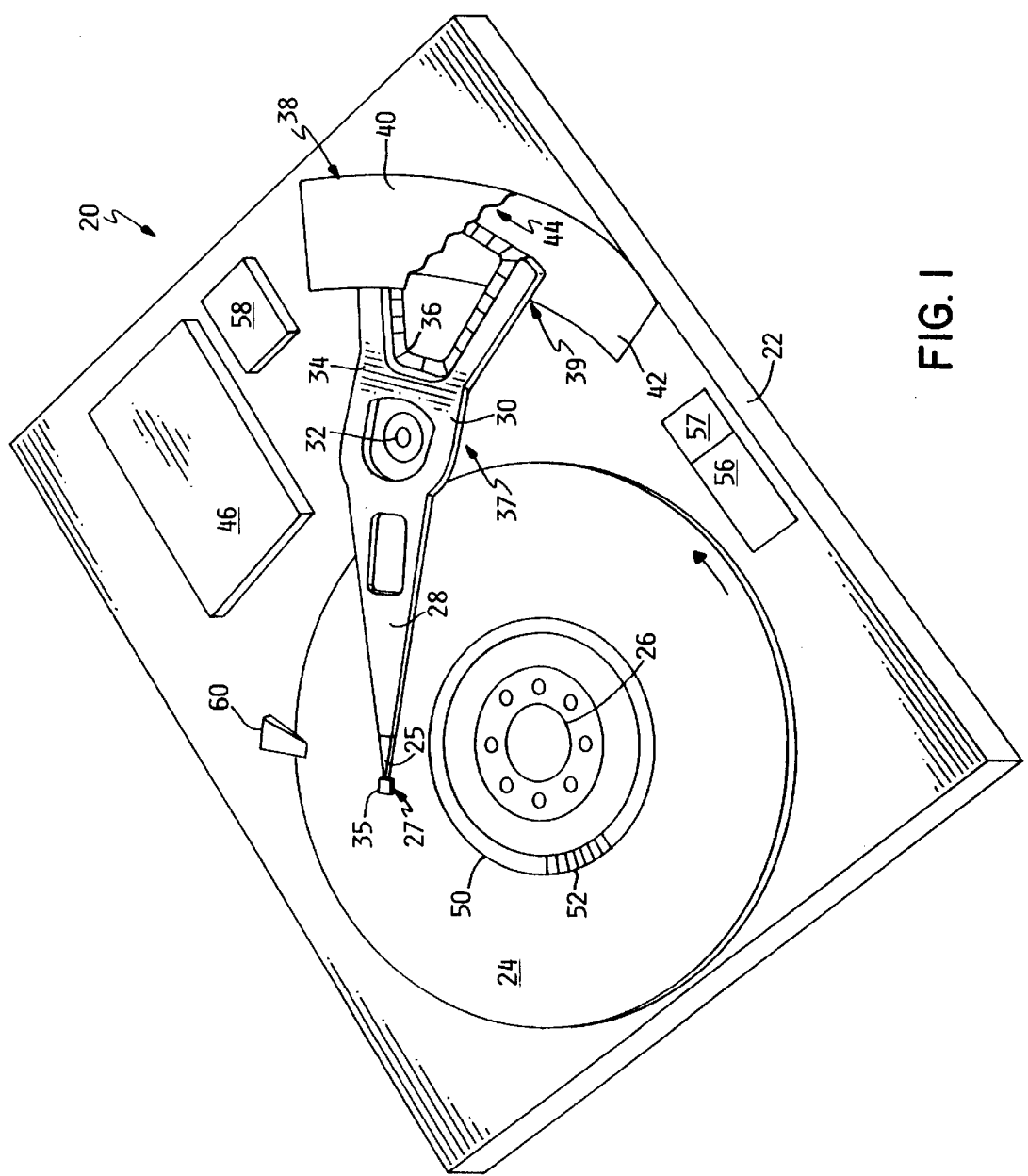
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A system and method in accordance with the principles of the present invention generally provide for in-situ monitoring of slider performance in a disk drive system. In a preferred embodiment, a system and method of the present invention provides for the detection and estimation of the resonance frequency of a slider airbearing. Changes in airbearing resonance frequency for a given slider at a particular test location outside of an expected range of variation is typically indicative of anomalous slider performance, such as a slider flying at a flyheight lower than an intended average flyheight. Unexpected changes in the airbearing resonance frequency of a given slider may be due to, for example, slider contamination, slider damage, or changes in atmospheric pressure.

A slider airbearing resonance frequency detection and estimation methodology in accordance with the principles of the present invention may be implemented using existing components of a data storage system, typically requiring little or no additional hardware. As such, the frequency detection and estimation methodology of the present invention may be implemented in existing and new data storage system designs, with simple modifications typically being made only to the head positioning processor software. Further, software embodying the frequency detection and estimation methodology of the present invention may be downloaded from a signal-bearing medium into in-service data storage systems.

Figure 2:
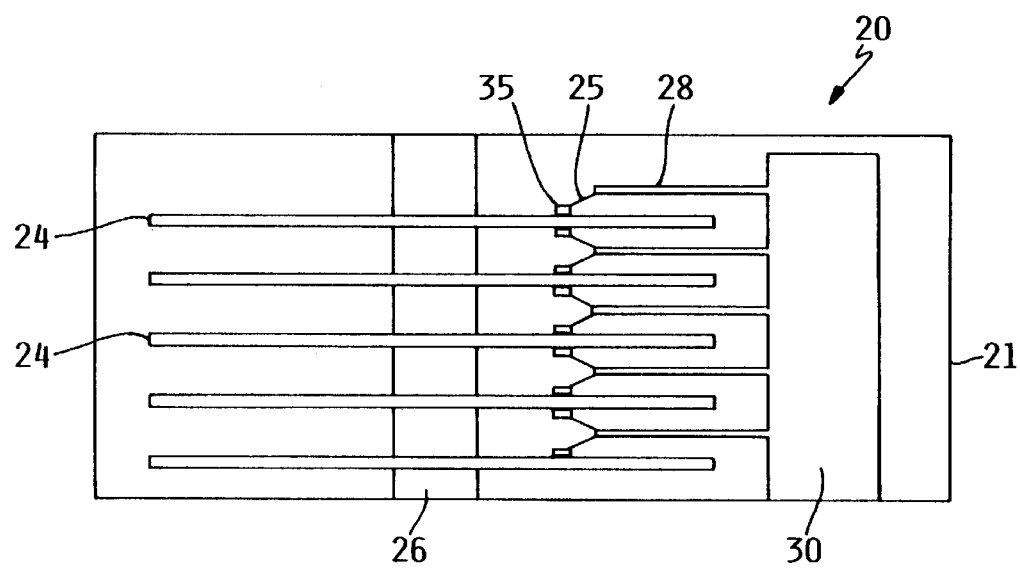
FIG. 2 is a side plan view of a disk drive system comprising a plurality of data storage disks.

Referring to the drawings, and more particularly to FIGS. 1 and 2, there is illustrated a data storage system 20 within which the slider airbearing resonance frequency detection and estimation methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically formatted to include a plurality of spaced concentric tracks 50. One or more of the disks 24 may alternatively be formatted to include a spiraled track configuration, or a combination of concentric and spiraled track configurations. Digital information is typically stored in the form of magnetic transitions along tracks 50. Tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24, which is typically on the order of 40–100 nanometers (nm), is commonly referred to as head-to-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a polyphase AC motor or, alternatively, a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

Figure 3:
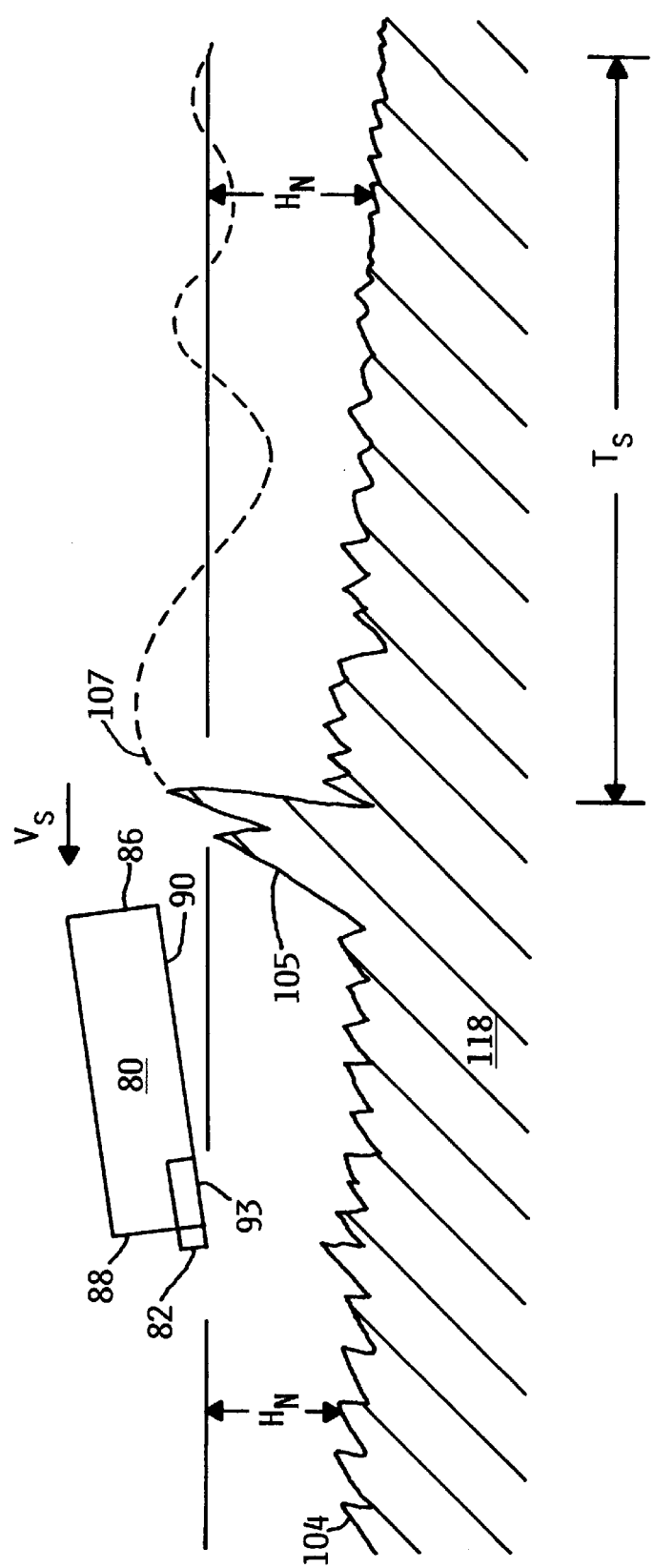
FIG. 3 is a partial sectional side view of an air bearing surface of a slider supported on an air bearing above a surface of a data storage disk, the surface of the disk including a defect or obstruction.

Referring now to FIG. 3, there is illustrated a sectional side view of an airbearing slider 80 which includes a lower surface 90 and a transducer element 82 mounted toward the trailing edge 88 of the airbearing surface 90. The surface 104 of data storage disk 118 is shown moving at a velocity, $V_S$, relative to the radially stationary airbearing slider 80. A defect 105 is shown protruding upwardly from the surface 104 of the data storage disk 118. The defect 105 is generally representative of any disk surface defect or obstruction, but will be described hereinafter as an asperity 105.

It is known that asperities 105 typically arise from the surface 104 of a disk 118 in a highly randomized and unpredictable manner. A magneto-resistive transducer element 82, for example, is particularly sensitive to contact with an asperity 105 or other obstruction due in part to its inherent sensitivity to temperature variations. Intermittent contact between an MR transducer element 82 and asperity 105 or other obstruction results in a temperature increase in the MR transducer element 82, and often renders the data written at the effective disk surface location unreadable or unrecoverable.

Head-to-disk disk contact events disrupt nominal operation of read/write transducers fabricated using other technologies. For example, a thin-film transducer element 82 is generally insensitive to temperature variations associated with asperity collisions. Many thin-film transducer elements 82 are configured to include write poles biased with a voltage potential and are mounted near the lower airbearing pad 93 and exposed to the disk surface 104. Intermittent contact between a thin-film transducer element 82 and an asperity 105 can result in arcing between the write poles and the disk surface 104. Such undesirable arcing frequently results in an inability to recover data previously written to the affected area of the disk surface 104.

Other airbearing slider configurations that incorporate optical fiber elements at a transducer element mounting location can also suffer varying degrees of performance degradation due to abrasions to the optical fiber probe element resulting from contact with an asperity 105.

It can be appreciated, therefore, that detecting sliders which are flying lower than expected, and thus contacting disk surface features and defects at a greater frequency, is necessary to ensure reliable and continuous operation of a disk drive system. In addition to the possibility of permanently losing data, repeated contact between a read/write head and disk surface asperity or defect can result in permanent damage to the airbearing slider, which may render the head and potentially the entire disk drive system unusable.

Still referring to FIG. 3, the data storage disk 118 typically rotates at a prescribed angular velocity, $\Omega D$, typically on the order of 5,000 to 8,000 RPM or higher, with the airbearing slider 80 remaining comparatively fixed with respect to the rapidly rotating disk surface 104. A typical head-to-disk contact event involves a collision between the lower airbearing pad 93 of the airbearing slider 80 and an asperity 105. In response to contact between an asperity 105 and the lower airbearing pad 93, the slider 80 is displaced vertically with respect to the surface 104 of the disk 118.

After the asperity 105 passes by the slider 80, the vertically displaced slider 80 follows a complex oscillatory trajectory 107 as it settles back to its nominal flyheight, $H_N$, over the disk surface 104. The contact between the asperity 105 and airbearing slider 80, and subsequent oscillatory settling of the slider 80 results in a short transient sinusoidal modulation in the readback signal envelope, which is indicative of slider airbearing resonance.

A slider airbearing resonance frequency detection and estimation approach in accordance with an embodiment of the present invention involves detecting the airbearing resonance frequency in the wake of a slider hitting a defect protruding from the surface of a data storage medium. The airbearing frequency detection and estimation methodology according to this embodiment exploits the phenomenon of spectral leakage as a means for estimating the frequency of a short transient sinusoidal signal that results from slider contact with a protruding surface defect. Large changes in the airbearing resonance frequency associated with a given slider flying at a given track or cylinder location of a data storage disk may be used to detect and identify a poor performing slider in-situ a data storage system.

It is well understood that the presence of sinusoidal modulation in the readback signal envelope at slider airbearing resonance frequencies is closely associated with contact between a surface of the slider and a feature protruding from a surface of a data storage medium. Experimental observations indicate that the airbearing resonance frequency, $f_{air}$, is an inverse nonlinear function of the flyheight, $\delta$, and the airbearing pad-area, A. This nonlinear relationship, g(a, b), may be expressed as:

$$f_{air} = g(1/\delta 1/A) \quad [1]$$

By way of example, a slider having relatively large airbearing pads and operating at relatively high flyheights may have an airbearing resonance frequency of around 80 kilohertz (kHz). Airbearing sliders having relatively small airbearing pads and flying at relatively lower flyheights may have airbearing resonance frequencies on the order of approximately twice that of larger sliders. Such smaller and lower flying sliders may have airbearing resonance frequencies of around 160 kHz.

In general, a slider that is flying relatively close to the disk surface will have a higher airbearing frequency, while a slider flying further from the disk surface will have a lower airbearing frequency relative to the close-flying slider. Further, slider airbearing pads having relatively small surface areas are associated with higher airbearing resonance frequencies, while larger slider airbearing pad areas are associated with lower airbearing resonance frequencies.

An important aspect of the present invention involves using the effect of spectral leakage as a means of estimating the frequency of a short transient sinusoidal signal, such as the frequency of sinusoidal modulation induced in the readback signal envelope resulting from a head-to-disk contact event.

It is understood that if a sinusoidal signal, x(n), does not go through an exact number of periods within a sampling window, then the Discrete Fourier Transform (DFT), X(k), of the sequence has nonzero values for almost all values of the frequency index, k. This phenomenon is referred to as spectral leakage.

The following equation may be used to relate the analog-to-digital sampling rate, $f_s$, the number of samples, N, and the DFT frequency index, k, to the DFT frequency, f(k):

$$f(k) = k \cdot f_s/N = k \cdot \omega/2\pi N \quad [2]$$

where, $f_s$ represents the sampling rate in samples per second or Hertz, N represents the number of samples, $\omega$ represents the digital frequency in radians, and k represents the DFT frequency index given by k=0, 1, 2, . . . , N/2.

Figure 4:
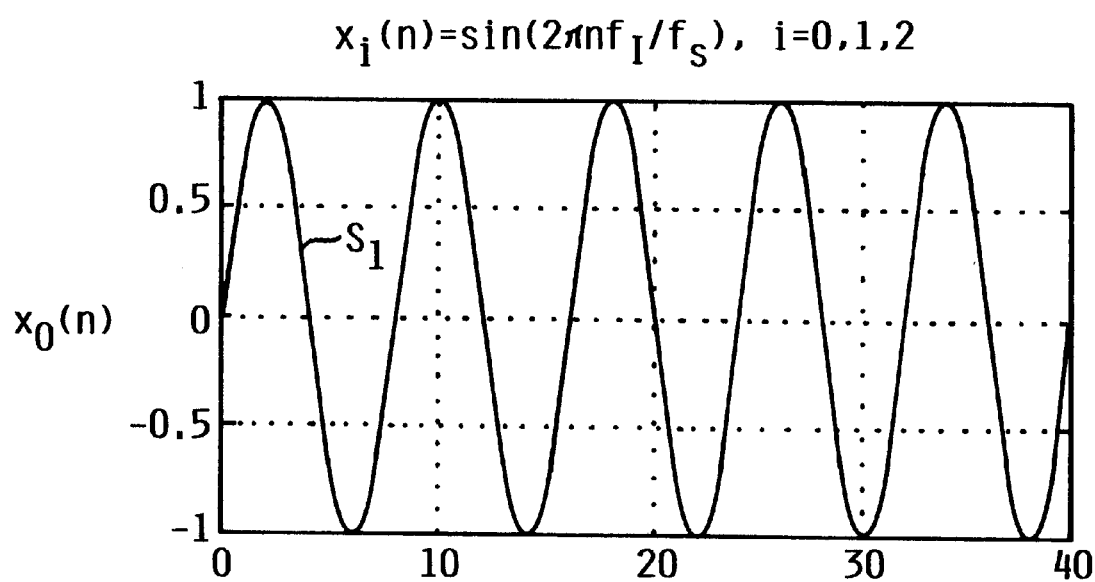
FIG. 4 is a graphical illustration of a sinusoidal signal having a frequency, $f_0$, and sampled at a sampling rate, $f_s$, where the sampling rate, $f_s$, is eight times the sinusoidal signal frequency, $f_0$.
Figure 5:
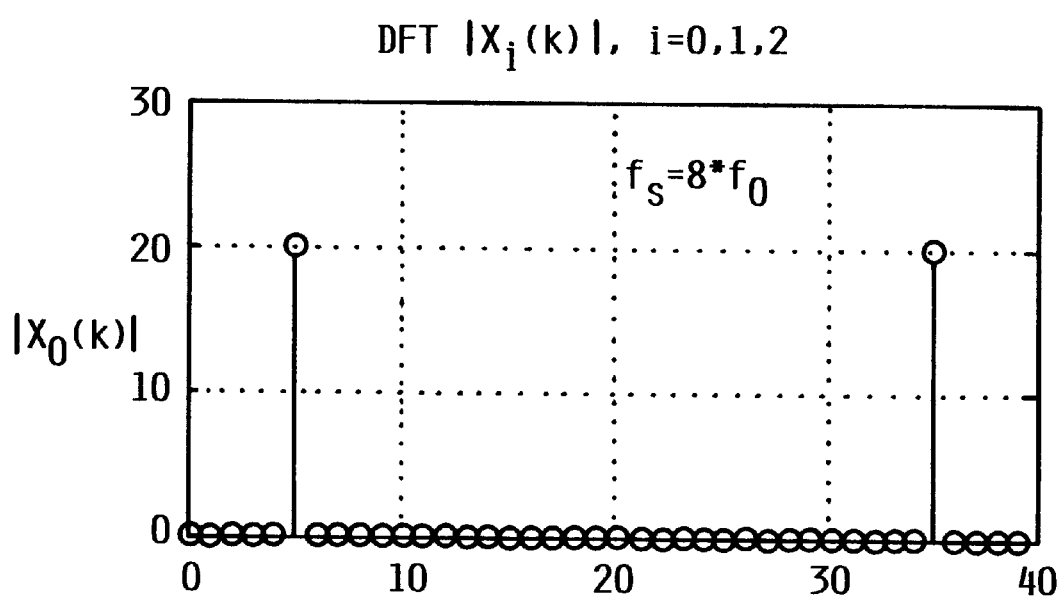
FIG. 5 depicts the magnitude of the Discrete Fourier Transform of the sinusoidal signal shown in FIG. 4.

The phenomenon of spectral leakage is best understood with reference to FIGS. 4–9. FIG. 4 is a graphical illustration of a sinusoidal signal, $S_1$, of frequency, $f_0$, sampled at sampling rate, $f_s$. In this example, sampling rate, $f_s$, is eight times the sinusoidal signal frequency, $f_0$. The graph of FIG. 4 defines a sampling window that spans an exact number of periods of the sinusoidal signal, $S_1$. In this particular example, exactly five periods of sinusoidal signal $S_1$ are shown. Since the sampling window of sinusoidal signal $S_1$ spans an exact number of signal periods, the Discrete Fourier Transform of signal $S_1$ exhibits only two non-zero components or spikes, as is shown in FIG. 5.

Figure 7:
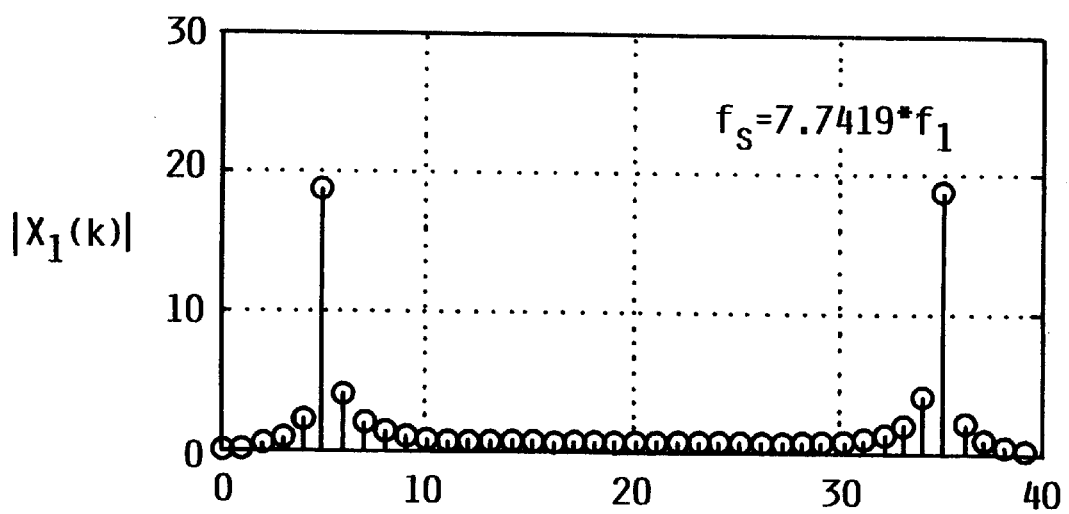
FIG. 7 illustrates the magnitude of the corresponding Discrete Fourier Transform of the signal shown in FIG. 6, and further illustrates the presence of spectral leakage.
Figure 9:
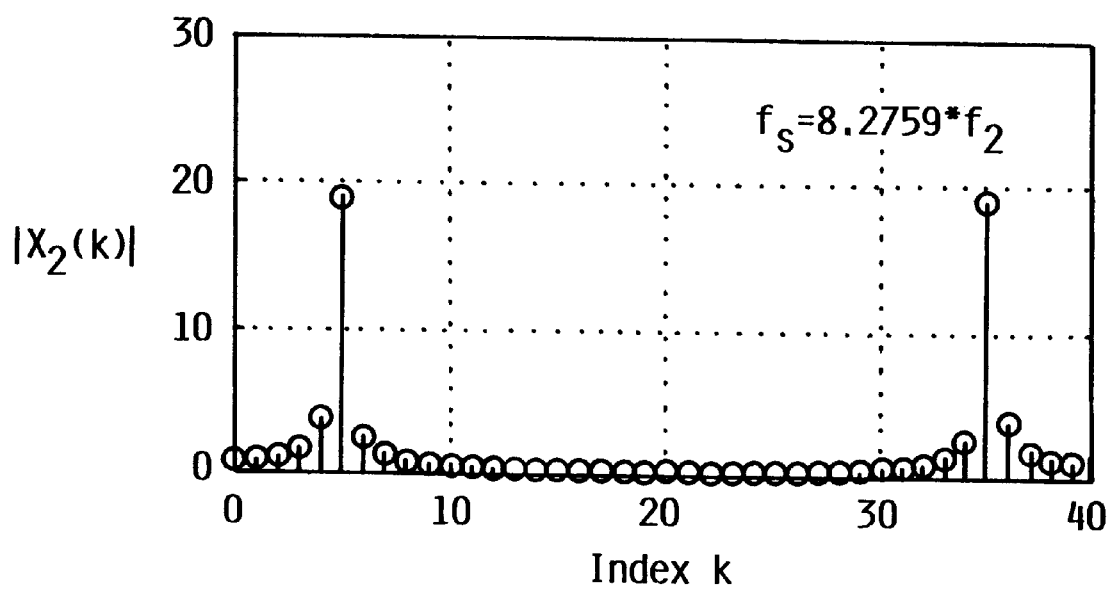
FIG. 9 illustrates the magnitude of the corresponding Discrete Fourier Transform of the signal shown in FIG. 8, and further illustrates the presence of spectral leakage.

FIG. 5 depicts the magnitude of the Discrete Fourier Transform of the sinusoidal signal, $S_1$, shown in FIG. 4. FIG. 5, as well as FIGS. 7 and 9, illustrates a spike at DFT components X(5) and X(35), respectively. It is noted that FIGS. 5, 7, and 9 depict the Discrete Fourier Transform of corresponding sinusoidal signals folded about the Nyquist frequency value, but the information of interest is that corresponding to frequencies between 0 Hz and the Nyquist frequency. The Nyquist frequency is understood to represent a frequency of one-half the sampling frequency.

The data depicted in FIG. 5 illustrates a case in which no spectral leakage is present. In this case, a spike occurs at DFT component X(5). This component is the most pronounced of the DFT components and, therefore, contains the most power (e.g., $P_0$=800 in this illustrative example). It is noted that FIG. 5 illustrates the case in which eight samples are obtained per period of signal $S_1$, and the signal sampling window spans five complete periods of the sinusoid, thereby providing for a total of 40 DFT samples. As such, DFT component X(5) is used.

Figure 6:
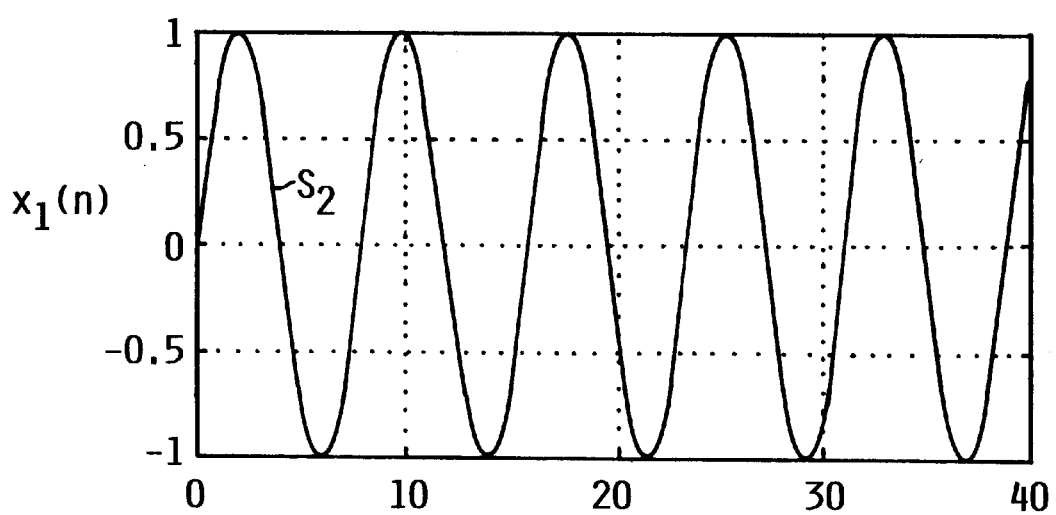
FIG. 6 is a graphical illustration of a sinusoidal signal having a frequency, $f_1$, which is different from the frequency, $f_0$, of the signal shown in FIG. 4, the signal being sampled at the same sampling rate, $f_s$, as that of FIG. 4.

The sinusoidal signal, $S_2$, shown in FIG. 6, represents a signal having a frequency, $f_1$, which is different from the frequency, $f_0$, of signal $S_1$ shown in FIG. 4. Signal $S_2$, shown in FIG. 6, is sampled at the same sampling rate, $f_s$, as that of FIG. 4. In this example, sinusoidal signal, $S_2$, has a frequency, $f_1$, of 1.0333 ($f_0$).

FIG. 7 illustrates the magnitude of the corresponding Discrete Fourier Transform of signal $S_2$ shown in FIG. 6. In particular, nonzero spectral components (i.e., spectral leakage) are clearly visible in FIG. 7 in proximity to the spike occurring at component x(5). Spectral components X(4) and x(6) represent two such nonzero spectral components indicative of spectral leakage associated with sinusoidal signal $S_2$ shown in FIG. 6.

Figure 8:
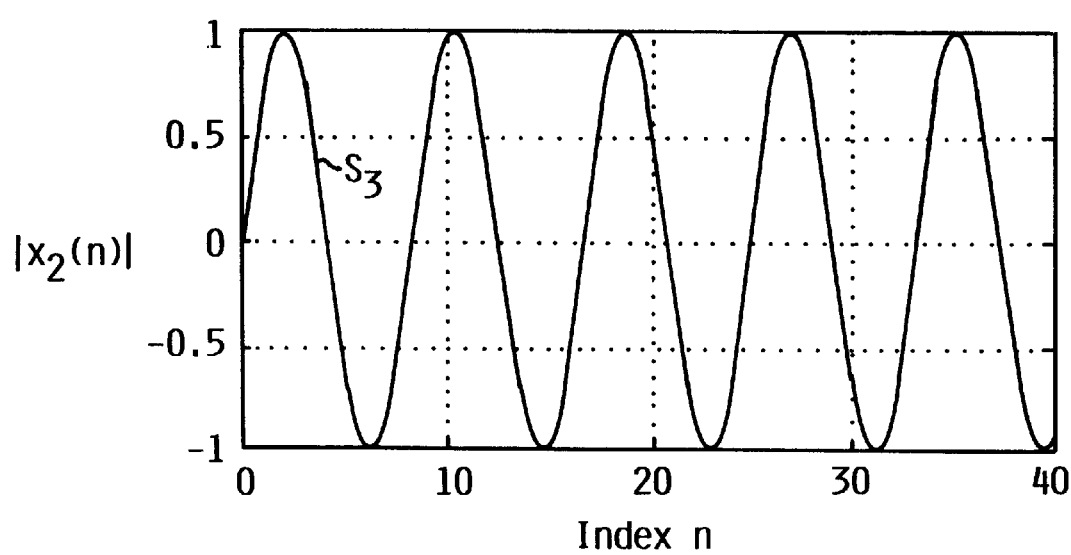
FIG. 8 is a graphical illustration of a sinusoidal signal having a frequency, $f_2$, which is different from frequencies $f_0$ and $f_1$ of the signals shown in FIGS. 4 and 6 respectively, the signal being sampled at the same sampling rate, $f_s$, as that of FIGS. 4 and 6.

Signal $S_3$, shown in FIG. 8, represents a sinusoidal signal having a frequency, $f_2$, equal to 0.9666 ($f_0$). FIG. 9 depicts the magnitude of the corresponding Discrete Fourier Transform of signal $S_3$ shown in FIG. 8. FIG. 9 illustrates nonzero spectral components resulting from spectral leakage, which is clearly visible in proximity to the spike occurring at component X(5). As discussed previously, the spike occurring at component X(5) contains the most power relative to other DFT components.

Referring to FIG. 5, it can be seen that the magnitude of spectral component X(5) associated with sinusoidal signal $S_1$ shown in FIG. 4 is at a maximum (i.e., 20) when the spectral leakage is at a relative minimum. It can be further seen in FIGS. 7 and 9 that the magnitude of spectral component X(5) associated with sinusoidal signals $S_2$ and $S_3$ respectively shown in FIGS. 6 and 8 is reduced from a maximum of 20 to approximately 19 due to the presence of neighboring nonzero spectral components. It will be appreciated that it may be difficult to identify the maximum magnitude of the spike X(5). For example, it may be difficult to detect changes in the magnitude of component X(5) from 20, as is shown in FIG. 5, to approximately 19, as is shown in FIG. 7, due to the relatively small gradient in the vicinity of the maximum.

In accordance with an embodiment of the present invention, one approach to detecting the peak magnitude of the DFT component X(5) involves sweeping the sampling rate, $f_s$, over a narrow frequency range and computing the value of component X(5). For purposes of illustration, it is assumed that $f_s=S \cdot f_a$, where $f_a$ represents a frequency that falls within the statistical range of airbearing frequencies for a particular disk drive system design, and the parameter S represents the number of samples per average airbearing cycle. At the coincidence of $f_a \approx f_{air}$, the spectral leakage will be at a relative minimum, at which point the airbearing resonance frequency, $f_{air}$, may be estimated, such as by use of the methodology described in detail hereinbelow.

In order to more accurately detect the peak magnitude of the DFT component X(5) and, therefore, to more accurately estimate the airbearing resonance frequency, $f_{air}$, it has been found productive to search for minimal spectral leakage as the sampling rate, $f_s$, is adjusted over a narrow frequency range.

Figure 10:
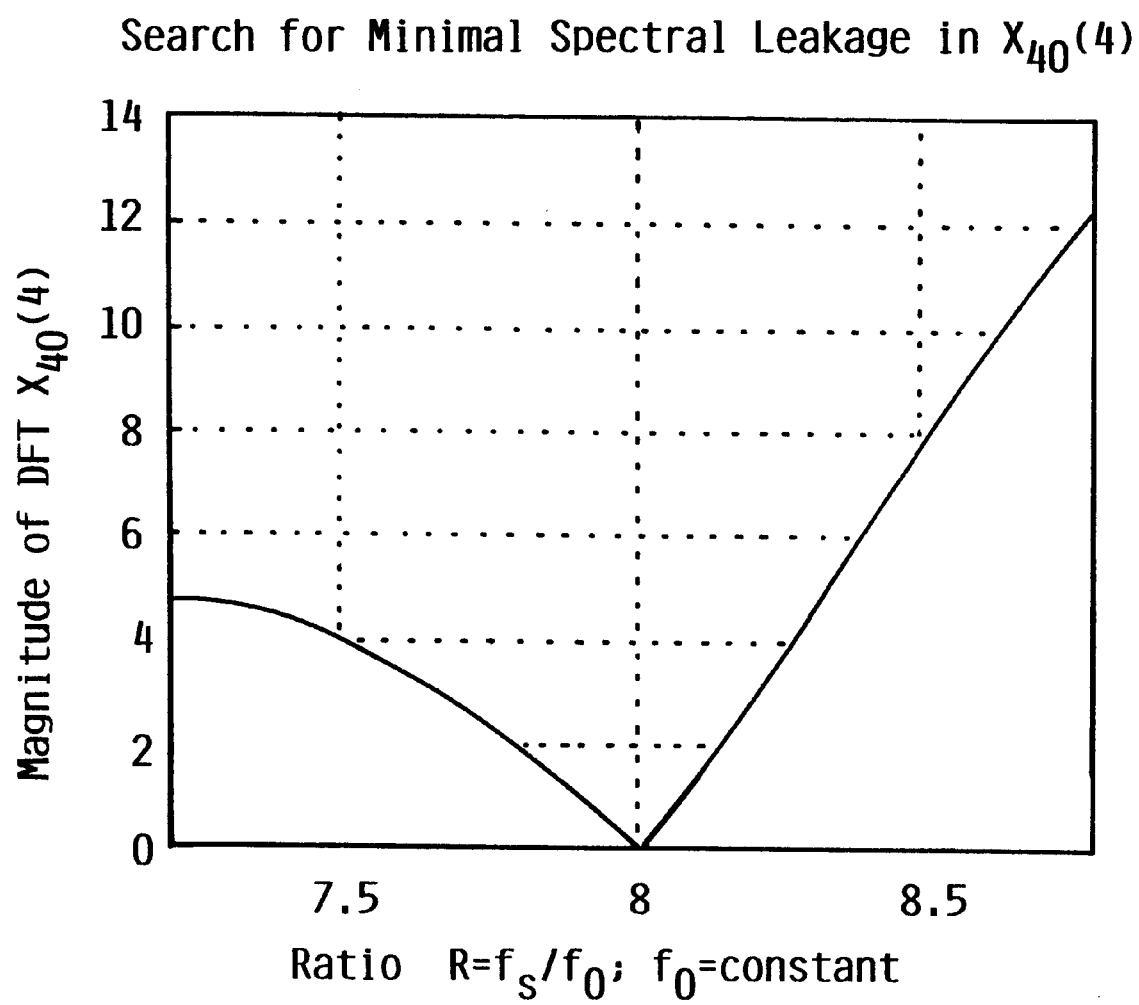
FIGS. 10 and 11 respectively illustrate the magnitudes of two DFT components adjacent a main DFT component for five complete periods of a sinusoidal signal as a function of the ratio of sampling rate, $f_s$, to constant sinusoidal frequency, $f_0$.
Figure 11:
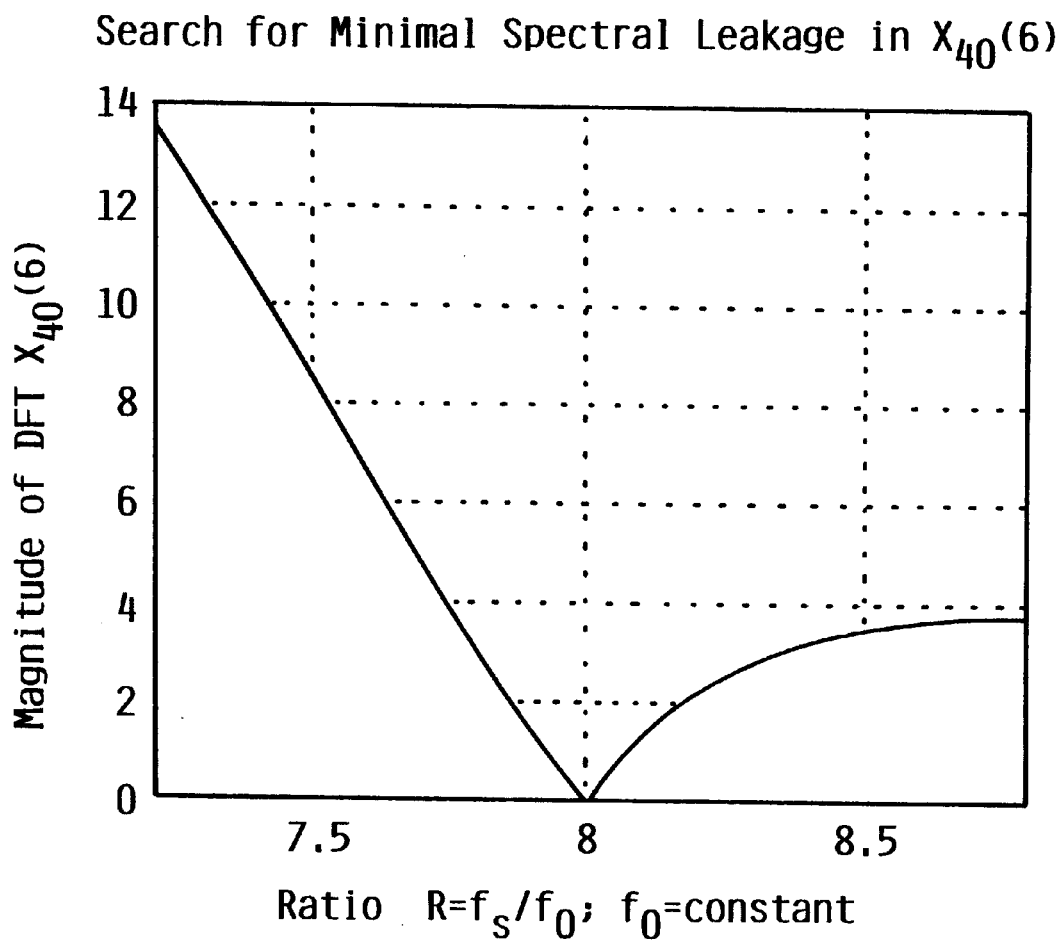

As is best illustrated in FIGS. 10 and 11, the DFT components located adjacent the main DFT component have sharply defined minimums. FIGS. 10 and 11 respectively illustrate the magnitudes of two DFT components adjacent the main DFT component for five complete periods of the sinusoidal signal as a function of the ratio of sampling rate, $f_s$, to constant sinusoidal frequency, $f_0$. FIG. 10 illustrates the magnitude of DFT component X(4), while FIG. 11 illustrates the magnitude of DFT component X(6) in this illustrative example.

FIGS. 10 and 11 show the clear definition of the minimum for each DFT component X(4) and X(6) occurring at $R=f_s/f_0=8$. The ratio, R, is a constant which, in this illustrative example, is given as 8, since there are 8 samples per period of the sinusoidal signal.

A preferred approach to searching for minimal spectral leakage involves comparing the magnitude of the DFT main component (e.g., component X(5)) with the magnitude of an adjacent DFT component (e.g., component X(4) or X(6)). In particular, it has been found useful to compute a DFT component ratio of the magnitude of one of the adjacent DFT components (e.g., component X(4) or X(6)) to the magnitude of the main DFT component (e.g., component X(5)). DFT component ratio values are computed at each of a number of sampling frequencies, and the minimum of these DFT component ratio values is used to estimate the airbearing resonance frequency.

In this example, DFT component X(5) is close to its maximum value at minimal spectral leakage, while the magnitudes of adjacent DFT components X(4) and X(6) are at a minimum, respectively. For P complete airbearing resonance frequency periods, it is useful to use the DFT component ratio of X(P−1)/X(P) or X(P+1)/X(P) when searching for minimal spectral leakage. Experimental results derived from use of a specially made bump disk drive system show that the DFT component ratio X(P+1)/X(P) yields better results when estimating the airbearing frequency, where P represents the number of complete airbearing resonance frequency periods. It will be appreciated, however, that other DFT component ratios may be employed, such as X(P+2)/X(P); X(P+3)/X(P); etc. It will be further appreciated that DFT component power ratios may also be employed, such as a DFT component power ratio of $[X(P+2)/X(P)]^2$.

Figure 13:
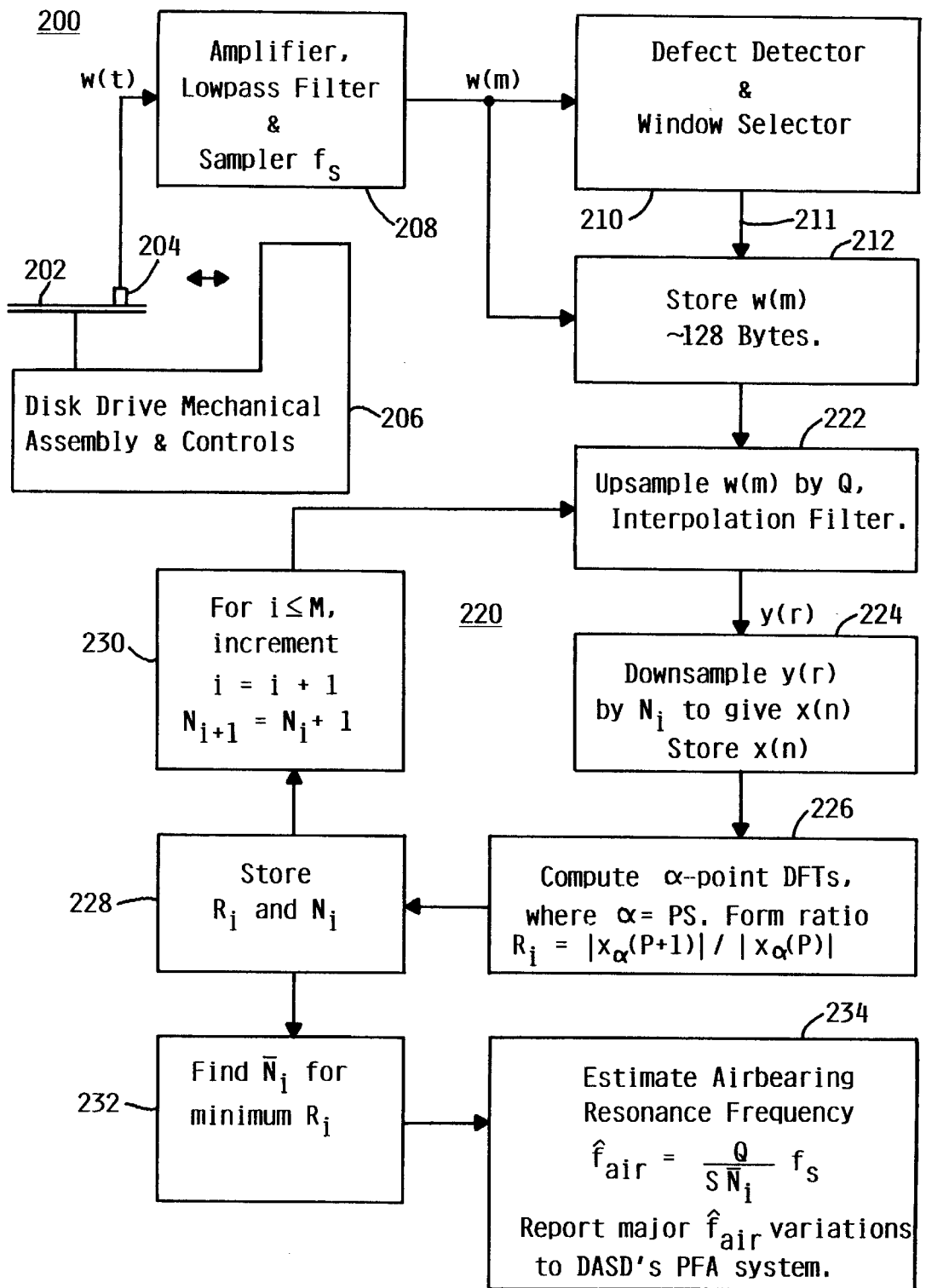
FIG. 13 is a block diagram of a system for estimating a slider airbearing frequency, $f_{air}$, in-situ a data storage system in accordance with an embodiment of the present invention.

Turning now to FIG. 13, there is illustrated an embodiment of an in-situ system for estimating a slider airbearing frequency, $f_{air}$, for a disk drive system. In accordance with this embodiment, the system 200 includes a disk drive assembly 206 including appropriate controls for controlling rotation of a magnetically recorded disk 202. A transducer 204, flying above the surface of data storage disk 202, senses signals in the form of magnetic transitions emanating from the disk surface 202.

Figure 12:
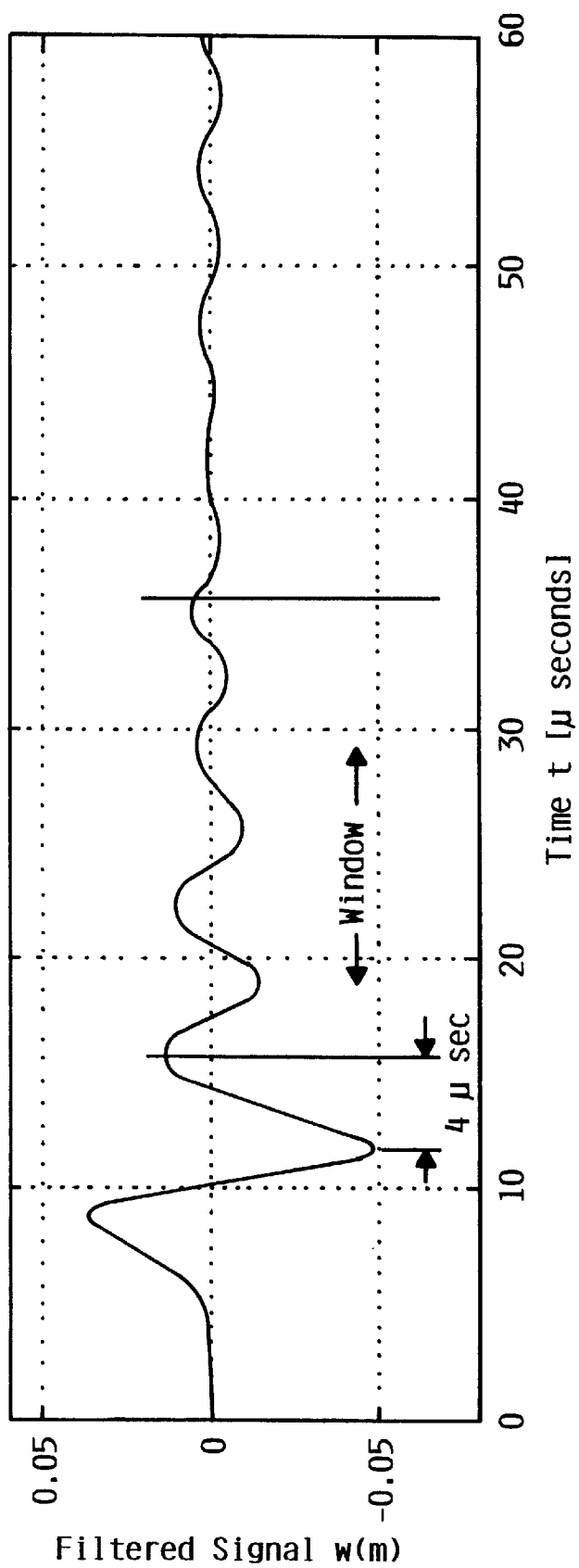
FIG. 12 is a graphical illustration of a filtered and sampled readback signal, w(m), depicting resonance of the slider airbearing associated with a head-to-disk contact event occurring in an experimental bump disk drive apparatus.

The sensed readback signal, w(t), is amplified, lowpass filtered, and sampled at a sampling rate, $f_s$, in block 208. The filtered and sampled readback signal, w(m), such as the filtered signal, w(m), shown in FIG. 12, is provided at the output of block 208. The amplitude of the sampled readback signal, w(m), is monitored by a defect detector and window selector unit 210.

A defect protruding from the surface of a data storage disk 202 will yield a large detectable signal peak, such as a positive or negative signal peak. An example of such a negative signal peak occurring in a sampled signal, w(m), provided at the output of block 208 can be seen in FIG. 12. If a negative threshold is exceeded in the sampled signal, w(m), the defect detector and window selector 210 is activated. A delayed windowed section immediately following the negative peak is captured and stored in a RAM storage unit 112, which is activated via line 211. The delay before the data capture is roughly 4 microseconds. The delayed windowed section immediately following the negative peak contains the best detectable portion of the airbearing resonance event. Similar delayed windows may be based on the positive signal peak.

FIG. 12 illustrates the large detectable negative signal peak resulting from a protruding defect developed on the surface of disk 202. FIG. 12 further illustrates a sampling window section immediately following the negative peak. The width of the window section should be wide enough to capture P complete airbearing periods. If the typical size of the RAM storage unit 212 is 128 bytes, for example, then eight complete periods at 16 samples per period may be stored in RAM storage unit 212.

The discrete signal segment, w(m), is then upsampled by a factor of Q in block 222 and later downsampled in block 224. The upsampling is implemented by inserting Q−1 zeros between each sample of signal w(m). In block 222, the upsampled discrete signal sequence is interpolated and amplified (scale=Q) by a lowpass filter having a cutoff frequency at approximately 1.5 times the highest anticipated airbearing frequency, $f_a$. It is noted that an interpolation filter may be operated in "Java mode" for purposes of minimizing storage. It is further noted that only the downsampled values of y(r) are used and stored as x(n) values, whereas other values of y(r) are ignored.

The upsampling factor Q is approximately 100–200, so that the interpolation filter output, y(r), has 100–200 times the number of samples associated with discrete signal segment w(m). However, in the downsampling unit 224, only a fraction, $1/N_i$, of these samples need to be stored. The RAM storage requirement with respect to block 224 are therefore less than that for block 212.

The downsampling is accomplished in an iterative mode in block 224 within process loop 220. The range of downsampling factors, $N_i$, is determined from the known or modeled statistical range of airbearing resonance frequencies, $f_{min} \leq f_a \leq f_{max}$. Computing the range of the downsampling factor, $N_i$, may be accomplished using Equation 3 below:

$$\frac{Qf_s}{Sf_{max}} \leq N_i \leq \frac{Qf_s}{Sf_{min}} \quad [3]$$

For purposes of illustration, if it is assumed that $f_s=1.25$ MHz, $f_{min}=120$ kHz, $f_{max}=180$ kHz, $Q=200$, and $S=16$, the range of the incremental downsampling factors, $N_i$, to be stored in memory, such as in the form of a look-up table, would be given as $87 \leq N_i \leq 130$. In this illustrative example, the number of downsampling values, M, for testing purposes is $M=130-87+1=44$.

Incrementing $N_i$ successively by one in the range $N_{min} \leq N_i \leq N_{max}$ may be used in the iterative process loop 220. A conquer-and-divide approach may be desirable due to the lack of uniformity in the DFT component ratio, $R_i$, as the downsampling factor $N_i$ is changed.

The downsampled values x(n) for each value of $N_i$ are temporarily stored in unit 224 such that the magnitudes of α-point Discrete Fourier Transforms, $X_\alpha(P)$, $X_\alpha(P+1)$, may be computed using Goertzel's individual DFT component method in block 226, from which the DFT component ratio $R_i$ is computed. The DFT component ratio, $R_i$, may be expressed as:

$$R_i = \frac{|X_\alpha(P+1)|}{|X_\alpha(P)|} \quad [4]$$

where, $\alpha = P \cdot S$, P represents the number of complete airbearing resonance frequency periods, and S represents the number of samples per period. The DFT component ratio, $R_i$, with its corresponding $N_i$ value is stored in block 228, and the downsampling factor $N_i$ is incremented by one in block 230. This process is then repeated beginning at upsampling and interpolation block 222 until all M values of $N_i$ have been exhausted.

The final steps to estimating the airbearing resonance frequency, $f_{air}$, are performed in blocks 232 and 234. Using the DFT component ratios, $R_i$, and corresponding $N_i$ values stored in block 228, the value of $N_i$ for which the DFT component ratio, $R_i$, is at a minimum is computed in block 232. The computation and monitor unit 234 then estimates the airbearing resonance frequency, $f_{air}$, using the following equation:

$$\hat{f}_{air} = (Qf_s)/(S\tilde{N}_i) \quad [5]$$

Any significant changes in the estimated airbearing resonance frequency, $f_{air}$, at a given test cylinder suggests appreciable unintended changes in slider flyheight. Such changes may be reported to a predictive failure analysis (PFA) system of the disk drive system.

When several periods, P, are included in the DFT component ratio estimate, the average value of the slider airbearing resonance frequency may be obtained. It is noted that due to the available signal-to-noise ratio, the damping of the sinusoidal airbearing resonance signal also limits the number of periods, P, that can be used.

The above-described slider airbearing resonance frequency estimation methodology was simulated using commercially available DSP software (e.g., MATLAB). Test results on simulated and actual data show very good results. By way of example, for the test bump disk drive system sequence shown in FIG. 12, where $f_s=1.25$ MHz, $Q=200$, $P=3$, and $S=16$, the minimum DFT component ratio (i.e., minimum spectral leakage) was computed as $R_{min}=0.1604$, and the estimated airbearing resonance frequency, $f_{air}$, was computed as $f_{air}=149$ kHz. Another very similar test bump disk drive system sequence produced an estimated airbearing resonance frequency, $f_{air}$, of $f_{air}=163$ kHz.

It is understood in the art that the Discrete Fourier Transform may be employed for spectral analysis of a finite-length signal composed of sinusoidal harmonics, or components, as long as the frequency, amplitude, and phase of each sinusoidal harmonic component is substantially time-invariant and independent of the sequence length. In general, the airbearing resonance frequency, $f_{air}$, is nonlinear, and is not entirely stationary over a given observation period. The modulation produced in the readback signal by the airbearing resonance has a frequency, amplitude, and phase that are slightly time-varying or non-stationary over the sequence length. However, an assumption of time-invariance of the lower harmonic components in the DFT is generally valid.

To further address the non-stationary character of the readback signal, an alternative to a DFT approach involves segmenting the sequence into a set of sub-sequences of shorter length, with each subsequence centered at uniform intervals of time and having its DFT computed separately. This method involves the use of a time-dependent DFT or Short-Time DFT (STFT). The Short-Time Fourier Transform uses a Hamming, Hanning, or other symmetric windows in the frequency transform to extract a finite-length portion of the sequence, such that the spectral characteristics of the extracted section are approximately stationary over the duration of the window.

Both DFT and STFT frequency transformation approaches may be used, however, due to the typically very short duration of the airbearing resonance. For an airbearing resonance frequency of 80 kHz, by way of example, there are about 80 samples during five airbearing resonance periods at 1.25 MHz. These 80 samples may be multiplied by a symmetric window before the DFT is computed.

A system and methodology in accordance with the principles of the present invention provide for estimating the frequency of a slider airbearing by searching for the minimal spectral leakage associated with airbearing resonance. The methodology is used in one embodiment to indirectly estimate changes in slider/transducer flyheight for each individual read/write head. A large variation in airbearing resonance at a given test cylinder is indicative of a major change in slider/transducer flyheight. For example, a large increase, such as on the order of 10% or higher, in the airbearing resonance frequency at a given test cylinder suggests that the slider/transducer is flying lower than during previous operation. This change in flyheight may be used to assess the general operating health of the head-to-disk interface (HDI). For example, a significant reduction in slider/transducer flyheight may indicate the presence of slider contamination, slider damage, or a change in atmospheric pressure.

The system and method of the present invention may also be used to operate with the position error signal (PES) in order to identify and determine suspension resonance problems. The methodology of the present invention requires a minimal amount of hardware resources, and may be used as a predictive failure analysis tool during in-situ disk drive system operation. Both the magnetic and thermal portions of the readback signal may be used. It is understood that the system and method of the present invention may be used to detect and estimate the frequency of any signal containing a sinusoidal component whose frequency is known to fall within a given frequency range, and is not limited to use in connection only with readback signals and position error signals associated with disk drive system operation.

The airbearing frequency estimation methodology of the present invention, as previously discussed, requires little or no additional hardware to implement in existing and future disk drive systems. The servo processor software may be modified to effect the process steps described with respect to the embodiment depicted in FIG. 13. An airbearing frequency estimation methodology according to the present invention may thus be effected, for example, by the controller implementing a sequence of machine-readable instructions. These instructions may reside in various types of signal-bearing media.

In this respect, another embodiment of the present invention concerns a programmed product which includes a signal-bearing medium embodying a program of machine-readable instructions, executable by a digital processor to perform method steps to effect an airbearing frequency estimation procedure. The signal-bearing media may include, for example, random access memory (RAM) provided within, or otherwise coupled to, the servo processor or arm electronics module.

Alternatively, the instructions may be contained in other signal-bearing media, such as one or more magnetic data storage diskettes, direct access data storage disks (e.g., a conventional hard drive or a RAID array), magnetic tape, alterable or non-alterable electronic read-only memory (e.g., EEPROM, ROM), flash memory, optical storage devices (e.g., CDROM or WORM), signal-bearing media including transmission media such as digital, analog, and communication links and wireless, and propagated signal media. In an illustrative embodiment, the machine-readable instructions may constitute lines of compiled "C" language code or "C++" object-oriented code.

The foregoing description of the various embodiments of the invention has been presented for the purposes of illustration and description. It is not intended to be exhaustive or to limit the invention to the precise form disclosed. For example, a variety of different frequency transform techniques may be employed, including Discrete Fourier Transform, Fast Fourier Transform (FFT), and Short-Time DFT (STFT) techniques. One of several frequency transform approaches may be implemented depending on whether the detected airbearing signal is stationary or non-stationary over time. Many modifications and variations are possible in light of the above teaching. It is intended that the scope of the invention be limited not by this detailed description, but rather by the claims appended hereto.

What is claimed is:

1. A method of estimating a value of a resonance frequency of an airbearing associated with a slider flying in proximity to a data storage medium, the method comprising:

obtaining a readback signal from the data storage medium; and estimating the value of the airbearing resonance frequency using a Discrete Fourier Transform of the readback signal in accordance with Goertzel's algorithm.

2. The method of claim 1, wherein estimating the value of the airbearing resonance frequency comprises estimating the value of the airbearing resonance frequency using the readback signal obtained from the data storage medium over a plurality of complete airbearing periods.

3. The method of claim 1, wherein estimating the value of the airbearing resonance frequency comprises using spectral leakage associated with the Discrete Fourier Transform of the readback signal to estimate the value of the airbearing resonance frequency.

4. The method of claim 1, wherein the Discrete Fourier Transform comprises a Fast Fourier Transform (FFT) or a Short-Time Discrete Fourier Transform (STFT) of the readback signal.

5. The method of claim 1, wherein estimating the value of the airbearing resonance frequency comprises:

producing, using the readback signal obtained from the data storage medium over a plurality of complete airbearing periods, a discrete signal segment comprising a plurality of frequency transform components; and estimating the value of the airbearing resonance frequency using spectral leakage of the discrete signal segment.

6. The method of claim 5, wherein the discrete signal segment is produced in response to detecting contact between the slider and a feature protruding from a surface of the data storage medium.

7. The method of claim 1, wherein the readback signal comprises a magnetic signal component, a thermal signal component, or magnetic and thermal signal components.

8. A method of estimating a value of a resonance frequency of an airbearing associated with a slider flying in proximity to a data storage medium, comprising:

producing, using a readback signal obtained from the data storage medium over a plurality of complete airbearing periods, a discrete signal segment comprising a plurality of frequency transform components;

computing a ratio of a magnitude of a first component to a magnitude of a second component at each of a plurality of sampling rates, the second component related to the resonance frequency of the airbearing; and estimating the value of the airbearing resonance frequency using a minimum of the ratios.

9. The method of claim 8, wherein the first component is a component adjacent the second component.

10. The method of claim 8, wherein the first component is a non-adjacent component relative to the second component.

11. The method of claim 8, wherein the sampling rates are defined by a number of samples per average airbearing period multiplied by a frequency defined within a range of expected airbearing frequencies.

12. The method of claim 8, wherein the ratios are power ratios.

13. The method of claim 8, wherein the readback signal comprises a magnetic signal component, a thermal signal component, or magnetic and thermal signal components.

14. An apparatus for estimating a value of a resonance frequency of an airbearing, comprising:

a data storage medium;

a transducer provided on a slider and producing a readback signal obtained from the data storage medium; and a processor that receives the readback signal from the transducer and estimates the value of the airbearing resonance frequency using a Discrete Fourier Transform of the readback signal in accordance with Goertzel's algorithm.

15. The apparatus of claim 14, wherein the processor estimates the value of the airbearing resonance frequency using spectral leakage associated with the Discrete Fourier Transform of the readback signal.

16. The apparatus of claim 14, wherein the Discrete Fourier Transform comprises a Fast Fourier Transform (FFT) or a Short-Time Discrete Fourier Transform (STFT) of the readback signal.

17. The apparatus of claim 14, further comprising a detection circuit, the detection circuit detecting a change in an amplitude of the readback signal indicative of contact between the slider and a feature protruding from a surface of the data storage medium.

18. The apparatus of claim 14, wherein the processor estimates the resonance frequency of the airbearing using instructions contained in a signal-bearing media.

19. The apparatus of claim 14, wherein the readback signal comprises a magnetic signal component, a thermal signal component, or magnetic and thermal signal components.

20. An apparatus for estimating a value of a resonance frequency of an airbearing, comprising:

a data storage medium;

a transducer provided on a slider and producing a readback signal obtained from the data storage medium; and a processor that receives the readback signal from the transducer, the processor:

producing, using the readback signal obtained from the data storage medium over a plurality of complete airbearing periods, a discrete signal segment comprising a plurality of frequency transform components;

computing a ratio of a magnitude of a first component to a magnitude of a second component at each of a plurality of sampling rates, the second component related to the resonance frequency of the airbearing; and estimating the value of the airbearing resonance frequency using a minimum of the ratios.

21. The apparatus of claim 20, wherein the first component is a component adjacent to or non-adjacent to the second component.

22. The apparatus of claim 20, wherein the ratios are power ratios.

23. The apparatus of claim 20, wherein the readback signal comprises a magnetic signal component, a thermal signal component, or magnetic and thermal signal components.

24. The apparatus of claim 20, wherein the processor varies a sampling rate of the discrete signal sample.

25. The apparatus of claim 20, wherein the processor estimates the resonance frequency of the airbearing using instructions contained in a signal-bearing media.

26. A data storing system, comprising:

a data storage disk;

a transducer provided on a slider;

an actuator for providing relative movement between the slider and the disk; and a processor that receives a readback signal from the transducer and estimates a value of the airbearing resonance frequency using a Discrete Fourier Transform of the readback signal in accordance with Goertzel's algorithm.

27. The system of claim 26, wherein the processor estimates the value of the airbearing resonance frequency using spectral leakage associated with the Discrete Fourier Transform of the readback signal.

28. The system of claim 26, wherein the Discrete Fourier Transform comprises a Fast Fourier Transform (FFT) or a Short-Time Discrete Fourier Transform (STFT) of the readback signal.

29. The system of claim 26, wherein the readback signal comprises a magnetic signal component, a thermal signal component, or magnetic and thermal signal components.

30. The system of claim 26, wherein the processor estimates the resonance frequency of the airbearing using instructions contained in a signal-bearing media.

31. A data storing system, comprising:

a data storage disk;

a transducer provided on a slider;

an actuator for providing relative movement between the slider and the disk; and a processor that receives a readback signal from the transducer, the processor:

producing, using the readback signal obtained from the data storage disk over a plurality of complete airbearing periods, a discrete signal segment comprising a plurality of frequency transform components;

computing a ratio of a magnitude of a first component to a magnitude of a second component at each of a plurality of sampling rates, the second component related to the resonance frequency of the airbearing; and estimating the value of the airbearing resonance frequency using a minimum of the ratios.

32. The system of claim 31, wherein the ratios are power ratios.

33. The system of claim 31, wherein the readback signal comprises a magnetic signal component, a thermal signal component, or magnetic and thermal signal components.

34. The system of claim 31, wherein the processor estimates the resonance frequency of the airbearing using instructions contained in a signal-bearing media.

* * * * *